United States Patent [19]

Shih et al.

[11] Patent Number: 4,762,866

[45] Date of Patent: Aug. 9, 1988

[54] LATEX ADHESIVE FOR BONDING POLYETHER URETHANE FOAM

[75] Inventors: Yen-Jer Shih, Somerset; Arthur B. Pruiksma, Chester; Paul R. Mudge, Somerville, all of N.J.

[73] Assignee: National Starch and Chemical Corporation, Bridgewater, N.J.

[21] Appl. No.: 50,259

[22] Filed: May 13, 1987

Related U.S. Application Data

[63] Continuation-in-part of Ser. No. 839,017, Mar. 12, 1986, abandoned.

[51] Int. Cl.$^4$ ............... C08L 63/02; C08L 3/02; C09J 3/16; B05D 3/02
[52] U.S. Cl. ............... 523/412; 156/328; 156/330; 524/906; 525/117; 525/119
[58] Field of Search ............... 523/412; 524/906; 525/117, 119; 156/328, 330

[56] References Cited

U.S. PATENT DOCUMENTS

| | | | |
|---|---|---|---|
| 4,104,230 | 8/1978 | Chang et al. | 523/411 |
| 4,471,082 | 9/1984 | Kwok et al. | 156/328 |
| 4,482,659 | 11/1984 | Sanjana et al. | 156/330 |
| 4,510,274 | 4/1985 | Okazaki et al. | 523/411 |
| 4,560,579 | 12/1985 | Siadat et al. | 156/330 |
| 4,575,525 | 3/1986 | Wacome et al. | 156/328 |
| 4,588,757 | 5/1986 | Minnis et al. | 156/330 |
| 4,619,952 | 10/1986 | Hart et al. | 523/412 |

FOREIGN PATENT DOCUMENTS 58-87175 5/1983 Japan .

*Primary Examiner*—Ronald W. Griffin
*Attorney, Agent, or Firm*—Kelley Margaret B.; Edwin M. Szala

[57] ABSTRACT

A two-part aqueous-based adhesive suitable for dry-bonding a polyether urethane foam to a rigid or semi-rigid substrate consists essentially of (a) an aqueous latex of an anionic emulsion polymer having a Tg of 0° C. or below, preferably −5° to −30° C., an effective amount of a diepoxide or polyepoxide curing agent, and optionally, but preferably, an effective amount of a fugitive plasticizer. The polymer consists essentially of about 10–30% ethylene, 40 to 80% of vinyl acetate, 5–35% of a $C_4$–$C_8$-dialkyl maleate, and 4–10% of an ethylenically unsaturated acid monomer (e.g., acrylic acid). Suitable substrates include styrene board and fiberglass board.

19 Claims, No Drawings

LATEX ADHESIVE FOR BONDING POLYETHER URETHANE FOAM

This application is a continuation-in-part of Ser. No. 839,017, filed Mar. 12, 1986, now abandoned.

BACKGROUND OF THE INVENTION

This invention relates to a two-part latex adhesives for dry bonding a polyether urethane foam to rigid or semi-rigid substrates such as styrene board and fiberglass.

Urethane foam has insulating and cushioning properties which are useful in various applications. The urethane foam is laminated to various rigid or semi-rigid substrates which can be used in the manufacture of furniture and construction materials, such as automotive headliners. In the past solvent-borne adhesives have been used in preparing the laminates. However, there has been an ongoing trend to replace solvent-based adhesives such as urethanes, chloroprenes, acrylonitrile-butadiene rubbers, and the like with aqueous adhesives. The aqueous emulsion adhesives which have been developed include, for example, chloroprene latices, ethylene-vinyl acetate copolymer emulsions, and acrylic emulsions.

Japan. Kokai 56-185532 (issued May 24, 1983 to Y. Huseya et al.) describes an aqueous adhesive useful for wet lamination of various substrates to a polyurethane foam. It contains 100 parts of a vinyl emulsion polymer (having a Tg within the range of $-40°$ C. to $+40°$ C.) containing 1–20 parts of an unsaturated acid monomer (e.g., carboxylic, sulfonic, or phosphate groups), 0.4–10 parts of an alkaline metal compound (e.g., potassium or sodium hydroxide, sodium acetate, sodium phosphate, sodium formate, sodium chloride, and preferably potassium or sodium carbonate, typically as a 5–30 wt. % aqueous solution), 2–40 parts of a compound having at least two epoxy groups in the molecule (e.g., an aqueous dispersion of polyhydric alcohol glycidyl compound or glycidyl ether type epoxy resin, and optionally 0.4–10 parts of a silane coupling agent (e.g., vinyl triethoxy silane or gamma-glycidoxypropyl methoxy silane). The inclusion of the acid monomer and the alkaline metal chemical increases heat-resistance. Both a high degree of heat-resistance and water-resistance are required for materials used in automobile interiors. Addition of the silane coupling agent reportedly improves the heat-resistance and water-resistance to meet the requirement for automobile interior use.

As the automotive industry is switching from polyester urethane to polyether urethane foams for automotive interior use (e.g., for headliners) because of their better humidity resistance, there is a need for a latex adhesive suitable for providing laminates with the required properties, i.e., good water- and heat-resistance and good adhesion.

SUMMARY OF THE INVENTION

The present invention provides a two-part aqueous-based adhesive suitable for dry-bonding a polyether urethane foam to a rigid or semi-rigid substrate, the adhesive consisting essentially of (a) an aqueous latex of an anionic emulsion polymer having a Tg of about 0° or less and consisting essentially of from about 10 to 30% of ethylene, from about 40 to 80% of vinyl acetate, from about at least 4% to about 10% of an ethylenically unsaturated monomer containing a carboxylic acid group, and from about 5 to 35% of a $C_4$–$C_8$-dialkyl maleate monomer, with the percentages being by weight and totaling 100%, (b) an effective amount of a diepoxide or polyepoxide as a curing agent, and (c) optionally an effective amount of a plasticizer. The preferred monomer amounts are about 15–25% ethylene, about 55–60% vinyl acetate, about 15–20% maleate monomer, and about 5–6% acid monomer. The preferred Tg is less than 0° C. to about $-40°$ C., most preferably about $-5°$ C. to about $-15°$ C. Minor amounts of other monomers which do not adversely affect the Tg or the adhesive of cohesive properties of the polymer may be used. Such optional monomers include triallyl cyanurate, 2-hydroxypropyl acrylate, and N-methylolacrylamide.

The epoxide is typically added as a solution, dispersion, or emulsion; however, it may be in any form as long as it is compatible with the latex. The amount of epoxide used will vary with the particular epoxide. Typically, it is from at least about 2% to up to about 8% by weight, based on the weight of dry polymer. The preferred amount of the polyepoxide is about 2–4%. Larger amounts of epoxide may act as a plasticizer with no improvement in curing. Useful epoxides include a self-catalyzed trifunctional epoxide, such as 4-glycidyloxy-N,N-diglycidylaniline in an organic solvent solution, and a glycidyl polyether such as the diglycidyl ether of bisphenol A in an aqueous emulsion. Preferably, the mixture of latex and epoxide is allowed to precure for several hours prior to application to the substrate.

The aqueous latex preferably contains a fugitive plasticizer such as a glycol ether in amounts of about 1 to 30%, preferably 5–20%, based on dry polymer. It may contain a compatible thickener, such as hydroxyethyl cellulose, and other additives typically used, provided the additive does not adversely affect the performance of the adhesive, i.e., the moisture-resistance, heat-resistance, water-resistance and, in the case of dry bonding, the open time. The plasticizer lowers the effective Tg of the polymer without any resultant loss in cohesive strength.

The adhesives, unlike the adhesives of the Japanese reference, are particularly useful for dry bonding at room temperature, and they do not require the post-addition of an alkaline metal chemical or a silane coupling agent.

DESCRIPTION OF THE PREFERRED EMBODIMENTS

The acid monomer used in combination with the ethylene and vinyl acetate is preferably acrylic acid, methacrylic acid, itaconic acid, or like monomers containing carboxylic acid groups. It may be possible to use other ethylenically unsaturated acid monomers such as those containing sulfonic acid groups (e.g., 2-acrylamidopropane sulfonic acid, 2-acrylamido-2-methylpropane sulfonic acid, and the like) and those containing phosphate groups (e.g., methacryloxy ethyl phosphate, bisacryloxy ethyl phosphate, and the like) provided they do not adversely affect the adhesive or cohesive properties of the polymer.

The $C_4$–$C_8$-dialkyl maleate monomer used in combination with the ethylene, vinyl acetate, and acid monomers is preferably dioctyl maleate. Other suitable maleate monomers include dibutyl maleate and dimethylamyl maleate.

The polymerization is carried out in the presence of water, an effective amount of an anionic initiator (e.g., sodium persulfate) or nonionic initiator (e.g., 2,2'-azobisisobutyronitrile), an emusion-stablilizing amount of an anionic surfactant (e.g., sodium lauryl sulfate) or nonionic surfactant (e.g., nonylphenol-ethylene oxide adduct), and optionally a buffering agent (e.g., sodium acetate).

The epoxy compounds suitable for use in the two-part adhesive contain two or more epoxy functional groups. These include water-soluble or partially water-soluble epoxy compounds, optionally containing a surfactant, as well as water-soluble or water-dispersible epoxides dissolved in a solvent. Suitable water-soluble epoxides are the polyalcohol polyglycidyl ethers or polycarboxyl polyglycidyl esters such as ethylene glycol diglycidyl ether, glycerol triglycidyl ether, propylene glycol diglycidyl ether, sorbitol polyglycidyl ether. Suitable water-dispersible epoxides include polyglycidyl ether epoxy resins (e.g., bisphenol-A, bisphenol-F, or bisphenol-S diglycidyl ether epoxy resin, phenol (novalac) epoxy resin, cresol epoxy resin, and the like), glycidylamine epoxy resins, aliphatic epoxy resins, and glycidyl ester epoxy resins.

It may be possible to use a curing agent other than a di- or polyepoxide, e.g., aziridines, carbodiimides, and like compounds capable of reacting with the carboxyl groups present in the polymer.

Various additives can be used provided there is no adverse effect on the final properites of the laminate. The alkaline metal salts of the Huseya reference (discussed in the Background) can be used. They are neither beneficial nor harmful. Fillers such as clay, talc, calcium carbonate, and titanium dioxide may be used. Plasticizers such as dibutyl phthalate, dioctyl phthalate or tackifiers such as rosin, terpene, and phenolic petroleum resin may be useful. The use of a wetting agent, dispersing agent, defoaming agent, deodorant, or antifreeze may be desirable.

The bonded assembly (i.e., the laminate) is prepared by uniformly applying the aqueous adhesive to the rigid or semi-rigid substrate. It may be possible to apply the adhesive to the foam provided the adhesive is thick enough and care is taken to avoid excessive penetration into the foam. Application to the rigid or semi-rigid substrate is preferred. Various coating methods may be used such as spraying, roll coating and the like. The coated substrate is dried before bonding. Drying is typically carried out at about 180°–200° F. (82°–93° C.); however, air-dried samples are satisfactory. The bonded assemblies are usually made at ambient conditions; however, the use of heat may shorten the time it takes for the ultimate bond to be achieved. The practioner will recognize that the temperature used will depend upon the substrate to which the foam is being laminated.

The suggested coating weight is 5 to 10 dry g./ft.$^2$, preferably about 7 g. The open time (i.e., the time within which, after drying, a useful bond can be made) will vary with the Tg, with the lower Tg polymers having a longer open time.

When dry bonding the foam to a styrene copolymer laminate with curved or flat surfaces, typical press conditions are ambient platen temperatures, a pressure of 25–30 psi, and a cycle of 2–10 seconds. When dry bonding to a curved or flat preformed fiberglass, typical press conditions are platen temperatures of 300° F. (149° C.) for the foam platen and ambient temperature for the fiberglass platen, a pressure of 5–15 psi, and a cycle of 3.5 sec. The bonded assemblies are normally conditioned 3–7 days at 72° F. (22° C.) to remove the water and/or permit curing to occur.

In the examples which follow all parts are by weight and all temperatures are in degrees Celsius unless otherwise noted. Brookfield viscosities (20 RPM) are measured at the indicated solids. Intrinsic viscosities (I.V.) are determined in dimethyl formamide (DMF) at 30° C. Deionized water is used in the preparation of the solutions and emulsions used in the polymerization.

The following test procedures are used.

180° Initial Peel Strength: The determination is carried out using a hand-held scale such as a Hunter force gauge. Acceptable performance is considered to be 1 pli (lb. per linear inch).

The bonded assemblies are cut into 1 in. wide test pieces after the indicated conditioning period.

Moisture Resistance: The conditioned assembly is placed in a 100° F. (38° C.)/100% relative humidity environment for 24 hours and the 180° peel strength is determined immediately upon withdrawal.

Heat Resistance-Procedure for Dry-Bonded Assemblies: One of the assemblies which has been subjected to the moisture resistance test is then placed in a 180° F. (82° C.) environment for 4 hours. The peel strength is determined immediately upon withdrawal.

Depending upon the foam, it requires from about 1–4 pli to achieve foam tear (1 for a weak foam and 4 for the strongest foam). In those cases where the foam tear (F.T.), as well as the pli value, is not described, the mode of failure is of a different type (e.g., in the adhesive itself or in an adhesion to substrate mode). In determining whether the amount of foam tear is high (H), medium (M), or low (L), both the depth and area of foam tear are considered.

EXAMPLE I

Part A-Preparation of the Polymer Emulsion

To a 10 l. autoclave were charged 450 g. of sodium alkyl aryl polyethylene oxide sulphate (3 moles ethylene oxide) as a 20 wt. % aqueous solution, 84 g. of an alkyl aryl polyethylene oxide (30 moles ethylene oxide) as a 70 wt. % aqueous solution, 60 g. sodium vinyl sulphonate as a 25 wt. % aqueous solution, 0.5 g. sodium acetate, 2 g. sodium formaldehyde sulphoxylate, 5 g. ferrous sulphate as a 1 wt. % aqueous solution, and 1050 g. water. After purging with nitrogen, 2250 g. vinyl acetate (VA), 15 g. triallyl cyanurate (TAC), and 750 g. di-2-ethylhexyl maleate (DOM) were charged to the reactor. The reactor was then pressurized to 750 psi with ethylene (E) and equilibrated at 50° C. for 15 minutes. The polymerization was then started by uniformly metering in a solution of 28 g. tertiary butyl hydroperoxide in 250 g. water and 20 g. sodium formaldehyde sulphoxylate and 1 g. sodium acetate in 250 g. water over a period of 5 hrs. A solution of 200 g. of acrylic acid (AA) in a total of 350 g. of water was also added over 4 hours.

Once the addition of the initiators was started, the reaction temperature was raised to 80°–82° C. and kept at this temperature until the reaction was completed. At the end of the initiator slow additions, the product was transferred to an evacuated vessel (30 l.) to remove residual ethylene from the system.

Using the general procedure described above, additional emulsions were prepared varying the amounts and/or monomeric compositions. The solids content of the emulsions ranged from 55–65%; the pH ranged from 3–4; and the viscosity ranged from 135–800 cps. The required monomers, i.e., E, VAc, DOM, AA, the optional monomers, i.e., TAC and 2-hydroxypropyl acrylate (HPA), and their respective amounts by weight are shown in Table I.

Part B-Preparation of the Adhesive

The aqueous latices of Part A (IA to ID) were mixed with the indicated amount of the fugitive plasticizer Propasol DM (a glycol ether available from Union Carbide) and about 0.8–1.0 parts of the thickener QP 4400 (a hydroxyethyl cellulose available from Union Carbide). They were then mixed with 3 parts of the epoxide 4-glycidyloxy-N,N'-diglycidylaniline (available from Ciby-Geigy under the trade name Araldite 0500). The epoxide (60%) was dissolved in 30% Solvesso 100 (an aromatic hydrocarbon with a flash point of 100° F.) and 10% ethoxy triglycol prior to mixing with the latices.

Part C-Evaluation of the Adhesive

The final adhesives were coated at 7 dry g./sq. ft. onto styrene board, dried for about 2 minutes at 180° F. (82° C.) plus 1 hour at ambient conditions. They were then dry bonded to polyether urethane foam at ambient temperature. The initial peel was tested after pressing; the bonded assemblies then were conditioned for 7 days at 72° F. prior to testing for moisture resistance and heat resistance.

the dioctyl maleate (DOM) monomer were prepared and evaluated using the dry bonding procedure of Example I. The adhesives contained 3 parts Araldite 0500 as the epoxide. When a plasticizer was used, it was 11 parts of Propasol DM. The coating weight was 7 dry g./ft$^2$.

Table II shows the polymer and adhesive composition. Adhesives IC and ID of Example I are included for comparison. The substrate was styrene board. The test results show that the high level the maleate monomer (35% DOM), although giving good initial peel was borderline in heat resistance and less than optimum in water-resistance. The use of only 25% DOM improved the heat-resistance peel strength but not the moisture-resistance peel strength. At 20% DOM both peel strengths were excellent. The results also show that with no DOM the adhesion was poor (0) and that the addition of the plasticizer did not significantly improve the adhesion (0.2).

EXAMPLE III

This example shows the effect of the plasticizer on the adhesive performance. The polymers were prepared as in Example I and evaluated as two-part adhesives (prepared as in Example I with 3 parts of the epoxide Araldite 0500) for dry bonding polyether polyurethane foam onto styrene board. The coating weight was 7 dry g./ft.$^2$. The polymer composition and properties, as well as the adhesive properties are shown in Table III. II-D, II-F, and II-G of Example II are included in Table III for comparison.

TABLE I

| | Major Monomer (%) Required | | | | | Polymer | | Adhesive Plasticizer (parts) | Peel Strength Test Results | | | | |
|---|---|---|---|---|---|---|---|---|---|---|---|---|---|
| | | | | | | | | | Initial Press | Moisture Resistance | | Heat Resistance | |
| Designation | E | VA | DOM | AA* | Other* | Intrinsic Viscosity | Actual Tg (°C.) | | pli | pli | (F.T.) | pli | (F.T.) |
| IA | 20 | 45 | 35 | 2.0 | 2 HPA | 0.34 | −29 | 0 | 1.7 | 1.3 | — | 0.7 | — |
| IB | 20 | 60 | 20 | 4.0 | 1.5 NMA | 0.91 | −6 | 16 | 0.8 | 0.7 | — | 1.2 | L |
| IC | 20 | 60 | 20 | 5.0 | — | 1.30 | −14 | 11 | 1.8 | >2 | H | >2 | H |
| ID | 20 | 60 | 20 | 5.7 | — | 1.60 | −12 | 4 | 1.5 | >2 | H | >2 | H |

*% based 100% of E, VA, and DOM

TABLE II

| | Required Monomer (%) | | | | | Polymer | | Adhesive Plasticizer (parts) | Peel Strength Test Results | | | | |
|---|---|---|---|---|---|---|---|---|---|---|---|---|---|
| | | | | | | | | | Initial Press | Moisture Resistance | | Heat Resistance | |
| Designation | E | VA | DOM | AA* | NMA* | Intrinsic Viscosity | Actual Tg (°C.) | | pli | pli | (F.T.) | pli | (F.T.) |
| II-A | 20 | 65 | 15 | 5 | — | 0.79 | −13 | 11 | 1.6 | >2 | H | >2 | H |
| I-C | 20 | 60 | 20 | 5 | — | 1.30 | −14 | 11 | 1.8 | >2 | H | >2 | H |
| II-B | 20 | 55 | 25 | 5 | — | 0.69 | −16 | 0 | >2 | >2 | H | 1.0 | L |
| II-C | 20 | 45 | 35 | 5 | — | 0.46 | −30 | 0 | 1.8 | 1.6 | — | 0.9 | — |
| I-D-1 | 20 | 60 | 20 | 5.70 | — | 1.60 | −12 | 14 | 1.7 | >2 | H | >2 | H |
| I-D-2 | 20 | 60 | 20 | 5.70 | — | 1.60 | −12 | 4 | 1.5 | >2 | H | >2 | H |
| 1** | 15 | 85 | 0 | 5 | — | 1.52 | −2 | 0 | 0 | 0 | — | 0 | — |
| 2** | 15 | 85 | 0 | 5 | — | 1.52 | −2 | 23 | 0.2 | 0.2 | — | 0.2 | — |
| 3** | 15 | 85 | 0 | 2 | 2 | 1.62 | −6 | 0 | 0 | 0 | — | 0 | — |
| 4** | 15 | 85 | 0 | 2 | 2 | 1.62 | −6 | 37 | 0.1 | 0.2 | — | 0.2 | — |

*% based 100% of E, VA, and DOM
**comparative

The test results given in Table I show that low acid levels (2–4%) do not give adequate moisture- and heat-resistance after conditioning (see IA and IB) and that >4 parts of acid are needed for optimum performance, i.e., high foam tear after conditioning.

EXAMPLE II

Polymers containing the preferred amount of the acrylic acid monomer (5–6%) and varying amounts of The results show that a low level of plasticizer is beneficial. It improves all the properties including initial peel from the press and generally improves the moisture- and heat-resistance.

EXAMPLE IV

This example describes the use of another epoxide to form the two-part adhesive. The adhesive was formulated as in Example I using the polymer designated IC except that 5.2 parts of Epon 828 were used instead of 3 parts of Araldite 0500. Dry bonding followed by a 7 day conditioning at 72° C. was used. The results in Table V show that the Epon 828 was satisfactory, giving a higher initial peel strength but somewhat lower moisture- and heat-resistance.

EXAMPLE V (comparative)

This example shows that the adhesives can also be used for wet bonding. The polymer designated I-C (see Example I) was used to wet bonding a polyether urethane foam to Kraft paper. The wet bonding adhesive was compounded as in Example I except that 14 parts clay and 5 parts polyvinyl alcohol were included. It also shows the effect of adding 3 parts of an alkaline metal salt, i.e., potassium bicarbonate, as taught in the Huseya reference. The dry bonding adhesive was compounded as in Example I. Polyether urethane foam was bonded onto styrene board.

The results in Table V show that the presence of the salt had no effect in either bonding method.

contained 3 parts of the epoxide Araldite 0500 and 11 parts of the fugitive plasticizer Propasol DM. The adhesive was formulated, coated, and conditioned as in Example I. The moisture- and heat resistance values were only 1.0 and 1.5, whereas the use of a similar adhesive (I C of Example I) with the polyether urethane foam provided a moisture- and heat-resistance of 2 and >2.

EXAMPLE VII (comparative)

This example shows that the use of a conventional adhesive which is excellent for dry bonding polyester urethane foam is unsatisfactory for dry bonding polyether urethane foam. The conventional adhesive is a crosslinking, water-borne acrylic emulsion adhesive available from National Starch and Chemical Corporation under the registered trademark Bondmaster ®. The adhesive is designated as 72-6710 and the catalyst is designated as 72-6711. It showed an initial peel strength on the polyether urethane foam of only 0.1 pli; after 24 hours the peel strength was only 0.3 pli. In contrast, on the polyester urethane foam the initial peel strength was 1.0 pli.

TABLE III

| | | | | | Polymer | | Adhesive | Peel Strength Test Results | | | | |
|---|---|---|---|---|---|---|---|---|---|---|---|---|
| | | | | | | | | Initial | Moisture | | Heat | |
| | Monomer (%) | | | | Intrinsic | Actual Tg | Plasticizer | Press | Resistance | | Resistance | |
| Designation | E | VA | DOM | AA* | Viscosity | (°C.) | (parts) | pli | pli | (F.T.) | pli | (F.T.) |
| II-A-1 | 20 | 65 | 15 | 5 | 0.79 | −13 | 3 | 1.5 | >2 | H | 1.3 | M |
| II-A-2 | 20 | 65 | 15 | 5 | 0.79 | −13 | 11 | 1.6 | >2 | H | >2 | H |
| III-C-1 | 20 | 60 | 20 | 5.25 | 0.80 | −6 | 0 | 0.7 | 1.8 | M | 1.0 | L |
| III-C-2 | 20 | 60 | 20 | 5.25 | 0.80 | −6 | 17 | 1.8 | >2 | H | >2 | H |
| II-F-1 | 20 | 60 | 20 | 5.35 | 0.96 | −10 | 0 | 0.7 | >2 | H | >2 | H |
| II-F-2 | 20 | 60 | 20 | 5.35 | 0.96 | −10 | 14 | 1.7 | >2 | H | >2 | H |
| II-G-1 | 20 | 60 | 20 | 5.35 | 1.07 | −12 | 0 | 0.7 | 1.8 | M | 1.2 | L |
| II-G-2 | 20 | 60 | 20 | 5.35 | 1.07 | −12 | 16 | 1.7 | >2 | H | >2 | H |

*% based 100% of E, VA, and DOM

TABLE IV

| | | | | | Adhesive | | Peel Strength Test Results | | | | |
|---|---|---|---|---|---|---|---|---|---|---|---|
| | | | | | | | Initial | Moisture | | Heat | |
| | Monomer (%) | | | | Epoxide | Plasticizer** | Press | Resistance | | Resistance | |
| Designation | E | VA | DOM | AA* | (parts) | (parts) | (pli) | pli | (F.T.) | pli | (F.T.) |
| IC | 20 | 60 | 20 | 5 | 3 parts of Araldite 0500 | 16 | 1.8 | >2.2 | H | >2 | H |
| IC | 20 | 60 | 20 | 5 | 5.2 parts of EPON 828 | 16 | 2.2 | 1.8 | L | 1.8 | L |

*% based 100% of E, VA, and DOM
**Proposal DM

EXAMPLE VI (comparative)

This example shows the use of a polymer of 20% E, 60% VA, 5% AA and 20% DOM having a Tg of −14° C. and intrinisic viscosity of 1.3, as a two-part adhesive for dry bonding to a polyester urethane foam. The latex Now that the preferred embodiments of the present invention have been described in detail, various modifications and improvements thereon will become readily apparent to those skilled in the art. Accordingly, the spirit and scope of the invention are to be limited only by the appended claims and foregoing specification.

TABLE V

| | | | | | | | | | | Peel Strength Test Results[d] | | | |
|---|---|---|---|---|---|---|---|---|---|---|---|---|---|
| | | | | | | Adhesive | | | | Moisture | | Heat | |
| | Required Monomers (%) | | | | Epoxy[a] | Plasticizer[b] | Thickener[c] | Clay | KHCO3 | Resistance | | Resistance[e] | |
| Designation | E | VA | DOM | AA** | (parts) | (parts) | (parts) | (parts) | (parts) | pli | (F.T.) | pli | (F.T.) |
| IC-Wet | 20 | 60 | 20 | 5 | 3 | 0 | 9 | 14 | 0 | >2 | H | >2 | H |
| IC-Wet | 20 | 60 | 20 | 5 | 3 | 0 | 9 | 14 | 3 | >2 | H | >2 | H |

TABLE V-continued

| | Required Monomers (%) | | | | Adhesive | | | | | Peel Strength Test Results[d] | | | |
| | | | | | Epoxy[a] | Plasticizer[b] | Thickener[c] | Clay | KHCO$_3$ | Moisture Resistance | | Heat Resistance[e] | |
| Designation | E | VA | DOM | AA** | (parts) | (parts) | (parts) | (parts) | (parts) | pli | (F.T.) | pli | (F.T.) |
|---|---|---|---|---|---|---|---|---|---|---|---|---|---|
| IC-Dry | 20 | 60 | 20 | 5 | 3 | 16 | — | — | 3 | >2 | H | >2 | H |

[a] Araldite 0500
[b] Proposal DM
[c] Polyvinyl alcohol
[d] The wet bonded assemblies were coated with 8–9 dry g./ft.² and conditioned for 11 days at 72° C. prior to testing the moisture- and heat-resistance, whereas the dry bonded assembly was coated with 7 dry g./ft.² and conditioned for 7 days at 72° C. prior to testing.
[e] The assembly was not subjected to a moisture-resistance test before being placed in a 190° F. environment for 4 hours. The peel strength was determined immediately upon withdrawal.
** % based on 100% of E, VA, and DOM

What is claimed:

1. A two-part aqueous-based adhesive suitable for dry-bonding a polyether urethane foam to a rigid or semi-rigid substrate, the adhesive consisting essentially of as separate parts:
   (a) an aqueous latex of an anionic emulsion polymer having a Tg of about 0° or less and consisting essentially of from about 10 to 30% of ethylene, about 40 to 80% of vinyl acetate, and about 4 to 10% of an ethylenically unsaturated monomer containing a carboxylic acid group, and from about 5 to 35% of a C$_4$-C$_8$-dialkyl maleate, percentages being by weight and totaling 100%; and
   (b) an effective amount of a diepoxide or polyepoxide as a curing agent.

2. A multi-part aqueous-based adhesive suitable for dry-bonding a polyether urethane foam to a rigid or semi-rigid substrate, the adhesive consisting essentially of:
   (a) an aqueous latex of an anionic emulsion polymer having a Tg of about 0° or less and consisting essentially of from about 10 to 30% of ethylene, about 40 to 80% of vinyl acetate, and about 4 to 10% of an ethylenically unsaturated monomer containing a carboxylic acid group, and from about 5 to 35% of a C$_4$-C$_8$-dialkyl maleate, percentages being by weight and totaling 100%;
   (b) an effective amount of a diepoxide or polyepoxide as a curing agent; and
   (c) an effective amount of a fugitive plasticizer.

3. The adhesive of claim 1 or 2, wherein the latex has a solids content of about 50–65%.

4. The adhesive of claim 3, wherein the polymer has a Tg within the range of less than 0° C. to about −40° C.

5. The adhesive of claim 4, wherein the ethylenically unsaturated acid-containing monomer is selected from the group consisting of acrylic acid, methacrylic acid, and itaconic acid and is present in an amount of >4% to about 8% by weight.

6. The adhesive of claim 4, wherein the polymer has a Tg of about −5° C. to −30° C.; wherein the polymer contains about 15–20% ethylene, 45–60% vinyl acetate, about 20–35% dioctyl maleate, and about 5–6% acrylic acid.

7. The adhesive of claim 6, wherein the polymer contains about 20% dioctylmaleate.

8. The adhesive of claim 4, wherein the amount of polyepoxide is about 2–8% by weight, based on the weight of dry polymer.

9. The adhesive of claim 8, wherein the polyepoxide is 2–4% of a tertiary amine-containing polyglycidyl resin or a polyglycidyl ether resin.

10. The adhesive of claim 9, wherein the tertiary amine-containing polyglycidyl resin is 4-glycidyloxy-N,N-diglycidylaniline and the polyglycidyl ether resin is the diglycidyl polyether of bisphenol-A.

11. The adhesive of claim 2, wherein the amount of plasticizer is about 1–30% by weight based on the weight of the dry polymer.

12. The adhesive of claim 4, wherein the plasticizer is 5–20% by weight, based on the weight of the dry polymer, of a glycol ether.

13. The adhesive of claim 4, wherein the latex contains, as an additive, a thickener, a defoamer, and/or a filler.

14. The adhesive of claim 13, wherein the thickener is hydroxyethyl cellulose.

15. The adhesive of claim 2, wherein the latex has a solids content of about 50–65%; wherein the polymer has a Tg of about −5° C. to −30° C. and contains about 15–20% ethylene, about 45–60% vinyl acetate, about 20–35% dioctyl maleate, and about 5–6% acrylic acid; wherein the epoxide is about 2–4% of 4-glycidyloxy-N,N-diglycidylaniline or the diglycidyl polyether of bisphenol-A and the plasticizer is about 5–20% a glycol ether, the percentages being by weight based on the weight of the dry polymer.

16. The adhesive of claim 15, wherein the substrate is a stryene board or a fiberglass board.

17. A method for dry bonding a polyether urethane foam to a rigid or semi-rigid substrate, which comprises the steps of applying the adhesive of claim 1 or 2 to the substrate or foam or to both, drying the coated surface with or without the use of heat, and mating the coated surfaces under sufficient pressure to form the bond.

18. The method of claim 17, wherein the mating of the surfaces is carried out up to 1 hour after the coating and drying.

19. The bonded assembly prepared by the method of claim 17.

* * * * *